United States Patent [19]

Dubin

[11] 4,124,740

[45] Nov. 7, 1978

[54] SODIUM-SULFUR BATTERY

[75] Inventor: Robert R. Dubin, Ballston Lake, N.Y.

[73] Assignee: Electric Power Research Institute, Inc., Palo Alto, Calif.

[21] Appl. No.: 864,732

[22] Filed: Dec. 27, 1977

[51] Int. Cl.$^2$ .................................................. H01M 10/39
[52] U.S. Cl. ................................. 429/104; 429/185; 29/623.2
[58] Field of Search ............... 429/104, 102, 103, 122, 429/163, 174, 185, 191, 31, 218; 65/59 B, 59 R; 228/124; 29/623.2

[56] References Cited

U.S. PATENT DOCUMENTS

| | | | |
|---|---|---|---|
| 3,679,480 | 7/1972 | Brown et al. | 429/104 |
| 3,811,943 | 5/1974 | Minck et al. | 429/104 |

*Primary Examiner*—Anthony Skapars

*Attorney, Agent, or Firm*—Flehr, Hohbach, Test, Albritton & Herbert

[57] ABSTRACT

A new seal for a sodium-sulfur battery is disclosed herein. The sodium-sulfur battery uses two cylindrical containers for containing sulfur and sodium in molten states and a beta-alumina electrolyte tube located primarily within the sulfur container. The battery disclosed herein includes a novel header, preferably a metal header, between the containers and through which the beta-alumina tube extends. In order to prevent either the sulfur or sodium from passing between the header and tube, the header includes an inner circumferential surface which forms a continuous mechanical seal around and against the tube to prevent the sulfur or sodium from passing therebetween. The header is attached to, but must electrically isolate, the two containers.

24 Claims, 2 Drawing Figures

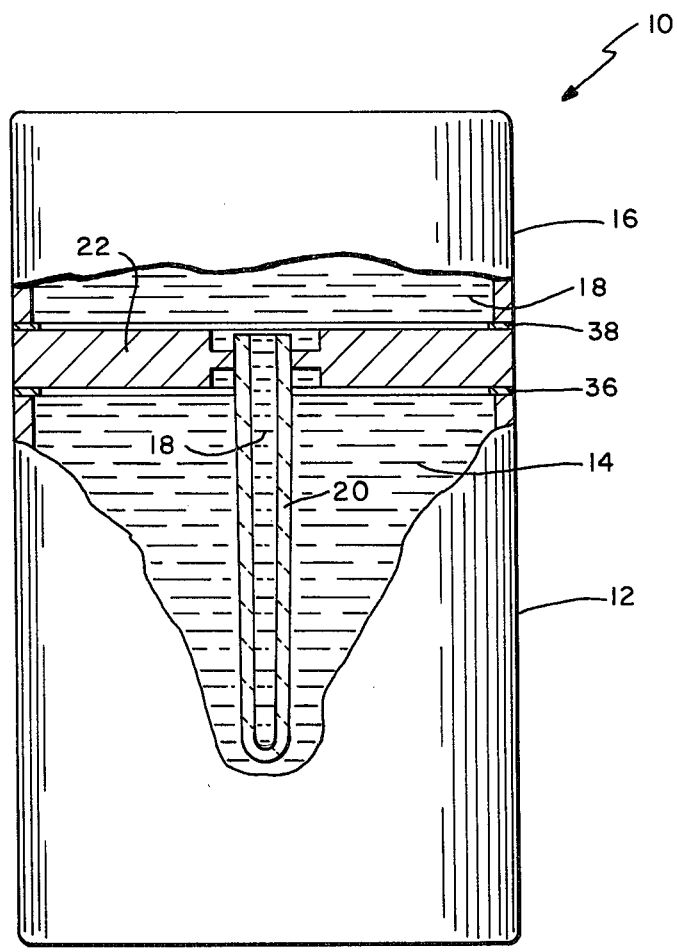
FIG.—1
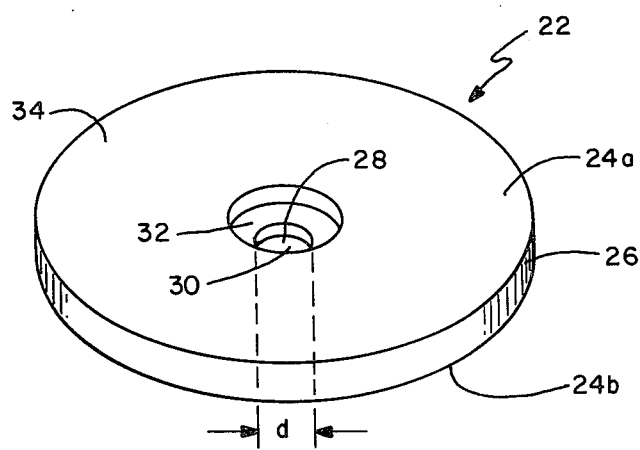
FIG.—2

SODIUM-SULFUR BATTERY

BACKGROUND OF THE INVENTION

The present invention relates generally to sodium-sulfur batteries and more particularly to the utilization of a specific header, preferably a metal header, in this battery and a particular method of assembling the header.

A conventional sodium-sulfur battery of the prior art typically includes a first metal container which contains sulfur in a molten state, a second metal container which contains sodium in a molten state, and a beta-alumina tube extending into the sulfur in the first container but which opens to the second container for receiving the molten sodium therein. In this overall configuration, the first container, that is, the container including molten sulfur, acts as the positive electrode of the battery; the second container, that is, the container including molten sodium, acts as its negative electrode; and the beta-alumina tube acts as the solid electrolyte.

From the foregoing, it should be apparent that the two containers must be physically isolated and electrically insulated from one another. In a conventional sodium-sulfur battery design, this is typically accomplished by means of a ceramic header, specifically a header constructed of alpha-alumina. This header is located between the two containers and around the beta-alumina tube. While the juncture between the header and each container can be readily sealed by means of a mechanical bond or other nonmetal-to-metal bond, it is extremely difficult to provide a reliable seal directly between the header and the electrolyte tube. This is primarily because it is difficult to directly seal alpha-alumina and beta-alumina to one another. As a result, it has been necessary heretofore to utilize an intermediate component, typically a sodium resistant sealing glass, to join the two. There are however a number of particular drawbacks to this approach. First, it has been found that the sealing glass reacts with the beta-alumina to weaken the tube. Specifically, it has been found that during the forming process the glass has a tendency to draw out some of the sodium ions from the beta-alumina causing the formation of alpha-alumina crystals within the tube. Second, it has been found that over a period of time there is a degradation of the sealing glass and header materials caused by a chemical reaction with the molten cell reactants, specifically with the molten sodium. Third, there tends to be a devitrification of the sealing glass. Fourth, the sealing glass must have a coefficient of expansion compatible with the alpha and beta alumina.

As will be seen hereinafter, the sodium-sulfur battery of the present invention and its method of manufacture eliminate the foregoing disadvantages. Moreover, as will also be seen, this is accomplished in a reliable and yet uncomplicated and economical way.

OBJECTS AND SUMMARY OF THE INVENTION

One object of the present invention is to provide a sodium-sulfur battery which utilizes a beta-alumina electrolyte tube and which requires a header for the reasons described above, but which does not require an intermediate component such as sodium-resistant sealing glass to join the header to the electrolyte tube and hence eliminates the various associated drawbacks discussed above.

Another object of the present invention is to provide the battery just described in a reliable and yet economical and uncomplicated way.

Still another object of the present invention is to utilize a metal header which has certain bonding advantages to be described.

A further object of the present invention is to provide an uncomplicated and reliable method of assembling the header around and in sealing engagement with the electrolyte tube, without the utilization of an intermediate component such as sodium-resistant sealing glass.

The sodium-sulfur battery of the present invention includes many of the conventional components described above. For example, this battery includes a first container including sulfur in a molten state, a second container including sodium in a molten state and, like the batteries of the past, it includes a beta-alumina electrolyte tube located primarily within the sulfur container. Actually, the electrolyte tube is submerged in the sulfur within the first container and is opened to the sodium in the second container. Moreover, the battery also includes a header for physically separating the sulfur in the first container from the sodium in the second container. However, in accordance with the present invention, an intermediate component is not utilized to seal connect the header to the electrolyte tube. Rather, the header of the present invention includes an inner circumferential surface which defines an opening through which the beta-alumina tube extends and which forms a continuous mechanical seal around and against the tube sufficient to prevent the sulfur or sodium from passing therebetween.

In the preferred embodiment of the present invention, as will be seen, the header is constructed of a material which will expand to a limited extent when heated and which will contract to a limited extent when cooled down. In this embodiment, the opening through the header is sized to prevent the beta-alumina tube from being inserted therethrough when the header is at or below a first predetermined temperature. However, it is also sized to expand sufficiently to allow the tube to be readily inserted therethrough when the header is heated to a second, higher predetermined temperature. In this way, the header and beta-alumina tube can be assembled together by first heating the header at least to the second, higher predetermined temperature. While the header is at or above this temperature, the electrolyte tube is inserted through its opening. Thereafter, the header is allowed to cool down at least to the first lower temperature. In this way, the inner circumferential surface of the header forms a continuous mechanical seal around and against the tube sufficient to prevent the sulfur and sodium from passing therebetween. To assure seal reliability, the higher predetermined temperature must be higher than the maximun operating temperature of the cell.

BRIEF DESCRIPTION OF THE DRAWING

FIG. 1 is a vertical sectional view of a sodium-sulfur battery constructed in accordance with the present invention.

FIG. 2 is a perspective view of a header which comprises one component of the battery illustrated in FIG. 1.

DETAILED DESCRIPTION AND PREFERRED EMBODIMENTS

Turning now to the drawing, attention is specifically directed to FIG. 1 which illustrates a sodium-sulfur battery or cell which is constructed in accordance with the present invention and generally designated by the reference numeral 10. This battery or cell includes a bottom container 12 which is constructed of an electrically conductive metal, for example stainless steel, and, as illustrated, is closed at its bottom and opened at its top. Molten sulfur generally designated at 14 is located within and entirely fills this container. The second container 16, also constructed of an electrically conductive metal, for example stainless steel, is located above container 12 and is inverted relative to container 12, that is, it includes a closed top and an opened bottom. This latter container includes molten sodium indicated at 18.

In addition to these containers and the molten sulfur and sodium, battery 10 includes a longtitudinally extending beta-alumina electrolyte tube 20 which, as is well known, is constructed of beta-alumina, that is, a conventional combination of $Al_2O_3$, $Na_2O$ and additives such as $Li_2O$. This tube, which is closed at its bottom and opened at its top, extends into the molten sulfur within container 12 from container 16, that is, the tube opens into container 16 and hence, like container 16, the tube includes molten sodium. The beta-alumina tube 20 is supported in this position by means of a header 22 which is located between the two containers and around the beta-alumina tube and which is constructed in accordance with the present invention, as will be discussed in detail hereinafter.

With the exception of header 22 and the way in which it interacts with containers 12 and 16 and tube 20, the battery just described is conventional, that is the two containers, the molten sulfur and molten sodium, and the beta-alumina tube, are all typical components making up a conventional sodium-sulfur battery or cell. The bottom container 12 typically acts as the positive electrode of the battery while the top container 16 acts as its negative electrode. The beta-alumina tube acts as a solid electrolyte and the molten sulfur and sodium are, of course, the reactive constituents of the battery. The battery may include other conventional components (not shown).

In order to ensure proper operation, it is important to physically isolate containers 12 and 16 from one another so as to prevent the molten sulfur in container 12 from passing directly into container 16 and/or tube 20 and for preventing the molten sodium in containers 16 and tube 20 from passing directly into container 12. This is accomplished by means of header 22 which, as illustrated best in FIG. 2, takes the form of an annular disc having opposite sides 24a, and 24b, an outer circumferential periphery 26, and an inner circumferential periphery 26, and an inner circumferential periphery or surface 28 which defines a central opening through opening 30. As seen in FIG. 2, header 22 has an inner circumferential segment 32 which includes circumferential surface 28 and opening 30 and an outer circumferential segment 34 including outer circumferential periphery 26. For reasons to be discussed hereinafter, inner segment 32 is substantially thinner in cross-section than outer segment 34, as best seen in FIG. 1.

Returning to FIG. 1, it can be seen that the bottom side of disc-shaped header 22, that is side 24a, extends across the opening in container 12 such that its outer periphery rests against the rim of the container. In a similar fashion, the top side 24b of the header rests on the rim of container 16 and extends across its open end. In order to prevent the molten sulfur within container 12 from escaping between its rim and header, a conventional seal, indicated generally at 36, is provided between the underside of the header and the rim of this container. Any suitable seal which is compatable with the materials making up the header and container, and which will reliably prevent the escape of the molten sulfur will suffice. It can be a mechanical seal, that is, the container can be clamped to the underside of the header, or it can be a brazed or welded seal, i.e., a metal-to-metal bond (with exceptions to be noted below) or a glass seal. Actually any compatable sealing compound can be utilized. In like manner, the container 16 and the top side of header 22 are sealed together, as generally indicated at 38, to prevent the molten sodium within this container and within the electrolyte tube from escaping between the rim of this container and the header.

As stated previously, header 22 supports electrolyte tube 20 in the position illustrated in FIG. 1. As seen in this figure, the tube extends through opening 30 in the header. In accordance with one aspect of the present invention, the inner circumferential surface 28 defining this opening forms a continuous mechanical seal around and directly against the tube sufficient to prevent the molten sulphur or sodium from passing therebetween. This is accomplished without utilizing an intermediate component such as sealing glass. Rather, in accordance with another aspect of the present invention, the header is constructed of a material, preferably aluminum, which will expand to a limited extent when heated and which will contract to a limited extent when cooled down. Opening 30, which is preferably the same general configuration as that of tube 20, specifically circular in a preferred embodiment, is sized to prevent the tube from being inserted therethrough when the header is at or below a first predetermined temperature but is also sized to expand sufficient to allow the tube to be readily inserted therethrough when the header is heated to a second, higher predetermined temperature. The cell operating temperature also dictates requirements for the size of opening 30 as well as the lower and higher predetermined temperatures.

In accordance with the foregoing, the aluminum header 22 is joined to the beta-alumina electrolyte tube 20 by first heating the header at least to the higher predetermined temperature referred to above and while the header is at or above this temperature, the tube is inserted through its opening. Thereafter, the header is cooled down at least to the lower predetermined temperature referred to above. In this way, the inner circumferential surface 28 of the header forms a continuous mechanical compression seal around and against the tube resulting from the deformation and flow of the metal surface onto the ceramic surface as the metal cools down. This seal has been found to be sufficient to prevent the sulfur and sodium from passing therebetween.

In a preferred embodiment of the present invention, the beta-alumina tube is heated to a predetermined temperature before insertion into the header. This is to prevent or at least minimize thermal shock and, hence, the temperature selected should be sufficient to accomplish this. In an actual embodiment, the tube was preheated to 200° C. but other temperatures could be readily selected based on the end result desired.

As stated previously, header 22 in its preferred embodiment includes a thinner circumferential segment 32. This has been found to be desirable so that the resulting contraction of the aluminum header does not inadvertently crack or otherwise damage the tube. More specifically, the thinner segment, which because of its relative thinness is more flexible than the rest of the disc, will flex or give, to a limited extent, as the header contracts, thereby minimizing the possibility of causing damage to the tube while, at the same time, maintaining the desired mechanical seal.

In an actual working embodiment of the present invention, an aluminum header having a maximum thickness of 0.2 inch (thickness of outer segment 24) and an outer diameter of 1.25 inches with parallel polished faces was provided. The inner segment 32 was 0.015 inch thick and 0.060 inch wide and was formed about a center hole, specifically hole 30, machined 4 mils smaller than the outside diameter of the beta-alumina electrolyte tube which was approximately 1 centimeter in diameter. This was of course at room temperature, that is, 25° C. While in a preferred embodiment, the header is heated to about 580° C.–630° C., in this actual embodiment, it was heated to about 600° C. and the beta-alumina tube which in a preferred embodiment is heated to about 100° C.–300° C. was actually heated to 200° C. The tube was then positioned inside the header and the assembly was cooled down to room temperature. The resulting contraction of the aluminum header forced the inner circumferential segment 32 to deform around the tube thereby forming the mechanical seal. The resulting seal formed was an aluminum to beta-alumina compression seal. This seal was found to be mechanically strong and nearly helium leak tight and, in any event, prevented the passage of both the molten sodium and the molten sulfur therebetween.

As should be apparent from the foregoing, the particular size of opening 28 will depend upon the size of tube 20 and also the size and shape of the header and the particular material making up the header. However, once these parameters are determined, the opening 28 can be suitably sized, depending upon the degree of expansion and contraction of the header, to expand a sufficient amount at a predetermined temperature to allow the insertion of the tube and to contract a sufficient amount to provide the desired seal without damaging the tube. The particular temperatures to accomplish this can also be readily determined once these other parameters are selected. Moreover, in a preferred embodiment, tube 20 tapers inward from its top end to its bottom end, as illustrated in FIG. 1, although not necessarily drawn to scale. The utilization of a tapered tuber, for example one having a 2–20 mils/inch taper, facilitates the sizing of the header opening 28 to the tube diameter and prevents the tube from dropping through the header opening in the case of seal failure.

As stated above, the header 22 is preferably aluminum or other such metal which will expand and contract with temperature. An aluminum foil (not shown) may be placed between the tube and the metal header to better insure a leak-tight seal. When metal is used, it is necessary to electrically insulate it from at least one but preferably both of the containers 12 and 16. This may be accomplished in any suitable manner. For example, one or both sides of the header may be conventionally anodized, that is provided with an aluminum oxide surface layer, or sulfidated, that is provided with an aluminum sulfide surface layer, to satisfy this requirement but, in a preferred embodiment, anodization or sulfidation of all exposed surfaces of the header is preferred. However, where a particular surface is to be so treated, it is difficult if not impossible to braze or weld that surface to one of the containers or to connect the two in a similar metal-to-metal manner without destroying or otherwise adversely affecting the electrical insulation between the two. A mechanical seal or a diffusion bond between the container and the insulating surface would be necessary in this case. However, only one surface of the header needs to be insulated. Hence, by using a metal header, one of the surfaces can be conventionally connected by means of a metal-to-metal bonding technique, i.e. brazing, welding and the like, while the other surface is joined as if the header was not metal, i.e. by means of a mechanical connection, a diffusion bond between the container and insulation layer or the like.

What is claimed is:
1. A sodium sulfur battery, comprising:
 (a) first means for containing sulphur in a molten state;
 (b) second means for containing sodium in a molten state, said second means including a beta-alumina electrolyte tube located at least partially within the sulfur in said sulfur containing means; and
 (c) means for physically separating the sulfur in said first means from the sodium in said second means, said separating means including a header located between said first and second means and having an inner circumferential surface defining an opening through which said beta-alumina tube extends, said surface forming a continuous mechanical seal around and against said tube sufficient to prevent said sulfur or sodium from passing therebetween.

2. A battery according to claim 1 wherein said header is constructed of a material which will expand to a limited extent when heated and which will contract to a limited extent when cooled down.

3. A battery according to claim 2 wherein said material is aluminum.

4. A battery according to claim 3 including means for electrically insulating said header from at least one of said first and second containing means.

5. A battery according to claim 4 wherein said header includes opposite sides in contact with said first and second means, respectively, at least one of said sides being anodized to provide said electrical insulating means.

6. A battery according to claim 4 wherein said header includes opposite sides in contact with said first and second means, respectively, at least one of said sides being sulfidated to provide said electrical insulating means.

7. A battery according to claim 2 wherein said header includes an inner circumferential segment including said inner surface and an outer circumferential segment, said inner segment being thinner in cross section than said outer segment.

8. A battery according to claim 2 wherein said material is aluminum and such that, when said header is heated to a temperature at least equal to about 580° C.–630° C., it expands sufficient to allow said beta-alumina tube to be readily inserted through said opening and, when said header is at or below about 350° C., said opening, if left unobstructed, would be too small to allow said tube to be inserted therethrough.

9. A battery according to claim 1 wherein aluminum foil is located between the header and the electrolyte tube.

10. A battery according to claim 1 wherein said tube tapers inwardly from its top end to its bottom end.

11. A sodium-sulfur battery, comprising:
  (a) a first metal container for containing sulfur in a molten state;
  (b) a second metal container for containing sodium in a molten state;
  (c) a beta-alumina tube extending at least partially within the molten sulfur in said first container and also containing sodium therein, the interior of said tube being in fluid communication with the interior of said second container, whereby molten sodium from said second container can readily flow into said tube; and
  (d) means for physically separating and electrically insulating the sulfur in said first container from the sodium in said second container and in said beta-alumina tube, said means including
    (i) a disc shaped aluminum header located between said first and second containers and having an inner circumferential surface defining an opening through which said beta-alumina tube extends, said circumferential surface forming a continuous mechanical seal around and directly against said tube sufficient to prevent said sulfur or sodium from passing therebetween, said header having an inner circumferential segment including said inner surface and an outer circumferential segment, said inner segment being thinner in cross section than said outer segment,
    (ii) means for electrically insulating said aluminum header from at least one of said containers, and
    (iii) means for providing a continuous seal between said header and said first container and said header and said second container, whereby to prevent said sulfur and sodium from escaping from respective containers between the containers and said header.

12. A battery according to claim 11 wherein said header is such that, when said header is heated to a temperature at least equal to about 580° C-630°C., it expands sufficient to allow said beta-alumina tube to be readily inserted through said opening and, when said header is at or below about 350° C., said opening, if left unobstructed, would be too small to allow said tube to be inserted therethrough.

13. In a sodium-sulfur battery including a first container for containing sulfur in a molten state, a second container including sodium in an molten state and a beta-alumina electrolyte tube located partially within each of said containers, a method of preventing the sulfur and sodium from moving between said containers along the outer surface of said beta-alumina tube, said method comprising:
  (a) providing a header constructed of a material which will expand to a limited extent when heated and which will contract to a limited extent when cooled down, said header including an inner circumferential surface defining a through opening which is sized to prevent said tube from being inserted therethrough when said header is at or below a first predetermined temperature but which will expand sufficient to allow said tube to be readily inserted therethrough when said header is heated to a second, higher predetermined temperature;
  (b) heating said header at least to said second predetermined temperature;
  (c) while said header is at or above said second temperature, inserting said beta-alumina tube through said opening; and
  (d) cooling said header down at least to said first, lower temperature, whereby said inner circumferential surface forms a continuous mechanical seal around and against said tube sufficient to prevent said sulfur and sodium from passing therethrough.

14. A method according to claim 13, wherein said first, lower temperature is at most about 350° C.

15. A method according to claim 13, wherein said second, higher temperature is at least about 580° C.-630° C.

16. A method according to claim 13 including:
  (a) heating said beta-alumina tube to a predetermined temperature prior to its insertion through said opening.

17. A method according to claim 16 wherein said tube is heated to a temperature of about 100° C.-300° C.

18. A method according to claim 13 wherein said first, lower temperature is at most about 350° C., said second, higher temperature is at least about 580° C.-630° C. and including:
  (a) heating said beta-alumina tube to about 100° C.-300° C. prior to its insertion through said opening.

19. A method according to claim 13 wherein said header is constructed of aluminum and is in the form of a disc having opposite sides, said method including:
  (a) anodizing at least one of said opposite surfaces.

20. A method according to claim 13 wherein said header is constructed of aluminum and is in the form of a disc having opposite sides, said method including:
  (a) sulfidating at least one of said opposite sides.

21. In a sodium-sulphur battery including a first continuous container for containing sulphur in a molten state, a second container including sodium in a molten state and a beta-alumina electrolyte tube located partially within each of said containers, a method of preventing the sulphur and sodium from moving between said containers along the outer surface of said beta-alumina tube, said method comprising:
  (a) providing an aluminum header which will expand to a limited extent when heated and which will contract to a limited extent when cooled down. Said header including an inner circumferential surface defining a through opening which is sized to prevent said tube from being inserted therethrough when said header is at or below the temperature of about 350° C. but which will expand sufficient to allow said tube to be readily inserted therethrough when said header is heated to the temperature of at least about 580° C.-630° C., said header having an inner circumferential segment including said inner circumferential surface and an outer circumferential segment which is thicker in cross section than said inner segment;
  (b) heating said aluminum header to 580° C.-630° C.;
  (c) heating said beta-alumina tube to a temperature of about 100° C.-300° C.;
  (d) while said aluminum header and said beta-alumina tube are at their respective heated temperatures, inserting said beta-alumina tube through said opening; and (e) cooling said header down at least to said 350° C., whereby said inner circumferential surface forms a continuous mechanical seal around and against said tube sufficient to prevent said sulfur and sodium from passing therebetween.

22. A sodium-sulfur battery, comprising:
(a) a first metal container for containing sulfur in a molten state;
(b) a second metal container for containing sodium in a molten state;
(c) a beta-alumina tube extending at least partially within the the molten sulfur in said first container and also containing sodium therein, the interior of said tube being in fluid communication with the interior of said second container, whereby molten sodium from said second container can readily flow into said tube; and
(d) means for physically separating and electrically insulating the sulfur in said first container from the sodium in said second container and in said beta-alumina tube, said means including
 (i) a disc shaped metal header located between said first and second containers and having an inner circumferential surface defining an opening through which said beta-alumina tube extends;
 (ii) means for electrically insulating said header from at least one of said containers, and
 (iii) means for providing a continuous seal between said header and said first container and said header and said second container, whereby to prevent said sulfur and sodium from escaping from respective containers between the containers and said header.

23. A battery according to claim 22 wherein said header is electrically insulated from only one of said containers and wherein said continuous seal between said header and said other container is a metal-to-metal bond.

24. A battery according to claim 23 wherein said header is aluminum.

* * * * *